US012639395B2

(12) United States Patent
Yue et al.

(10) Patent No.: US 12,639,395 B2
(45) Date of Patent: May 26, 2026

(54) METHODS AND SYSTEMS FOR EMBEDDING AND EXTRACTING FREQUENCY DOMAIN-BASED WATERMARKS IN TABULAR DATA

(71) Applicants: Ming Xuan Yue, Vancouver (CA); Mohammad Akbari, Coquitlam (CA); Xin Che, Vancouver (CA); Yong Zhang, Richmond (CA)

(72) Inventors: Ming Xuan Yue, Vancouver (CA); Mohammad Akbari, Coquitlam (CA); Xin Che, Vancouver (CA); Yong Zhang, Richmond (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 178 days.

(21) Appl. No.: 18/491,517

(22) Filed: Oct. 20, 2023

(65) Prior Publication Data

US 2025/0131069 A1    Apr. 24, 2025

(51) Int. Cl.
*G06F 16/00*        (2019.01)
*G06F 17/14*        (2006.01)
*G06F 17/16*        (2006.01)

(52) U.S. Cl.
CPC .............. *G06F 17/14* (2013.01); *G06F 17/16* (2013.01)

(58) Field of Classification Search
CPC ................................................ G06F 17/14–16
See application file for complete search history.

(56) References Cited

U.S. PATENT DOCUMENTS

| | | | | |
|---|---|---|---|---|
| 6,104,826 | A * | 8/2000 | Nakagawa | ............ G06T 1/0028 |
| | | | | 382/248 |
| 6,259,801 | B1 | 7/2001 | Wakasu | |
| 7,123,718 | B1 | 10/2006 | Moskowitz | |
| 7,336,800 | B2 | 2/2008 | Miranda | |
| 8,385,662 | B1 * | 2/2013 | Yoon | .................. G06F 18/2135 |
| | | | | 382/156 |
| 8,526,611 | B2 | 9/2013 | Moskowitz | |

(Continued)

FOREIGN PATENT DOCUMENTS

| | | |
|---|---|---|
| CN | 101366266 A | 2/2009 |
| CN | 107330306 B | 11/2017 |

(Continued)

OTHER PUBLICATIONS

Kamran, M., and Farroq. M. "An Information-Preserving Watermarking Scheme for Right Protection of EMR Systems". IEEE Transactions on Knowledge and Data Engineering, vol. 24, No. 11. Nov. 2012.

(Continued)

*Primary Examiner* — Syed H Hasan

(57) ABSTRACT

Systems and methods embedding a frequency domain-based watermark in tabular data are provided. In some methods, a covariance matrix is computed for the tabular data. Row vectors of the tabular data are projected onto two orthonormal vectors $e_1$, $e_2$ of the covariance matrix. A signal space for the projected row vectors is determined. A frequency $f^*$ with a lowest power from the signal space is located. A watermark is embedded in the tabular data based on the frequency $f^*$.

20 Claims, 9 Drawing Sheets

(56) References Cited

U.S. PATENT DOCUMENTS

| | | | | |
|---|---|---|---|---|
| 8,923,548 | B2 | 12/2014 | Petrovic | |
| 10,461,930 | B2 | 10/2019 | Moskowitz | |
| 11,620,364 | B2 | 4/2023 | Crowley | |
| 11,620,365 | B2 | 4/2023 | Coleman | |
| 2004/0151316 | A1* | 8/2004 | Petrovic | G06T 1/0028 |
| | | | | 380/255 |
| 2008/0181449 | A1* | 7/2008 | Hannigan | G06T 1/0028 |
| | | | | 375/E7.089 |
| 2008/0209219 | A1* | 8/2008 | Rhein | G10L 19/018 |
| | | | | 704/E19.009 |
| 2009/0074242 | A1* | 3/2009 | Yamamoto | H04N 21/8358 |
| | | | | 382/100 |
| 2011/0007936 | A1* | 1/2011 | Rhoads | B42D 25/00 |
| | | | | 382/100 |
| 2022/0300842 | A1* | 9/2022 | Charette | G06F 21/16 |
| 2023/0008085 | A1* | 1/2023 | Ma | G06T 1/0085 |

FOREIGN PATENT DOCUMENTS

| | | | |
|---|---|---|---|
| EP | 2012269 | B1 | 1/2009 |
| WO | 2004035321 | A1 | 4/2004 |
| WO | 2017165242 | A1 | 9/2017 |

OTHER PUBLICATIONS

Sebe, F. et al. "Noise-Robust Watermarking for Numerical Datasets". MDAI 2005, LNAI 3558 Jul. 2005.

Manjula, R. and Settipalli, N. "A new Relational Watermarking Scheme Resilient to Additive Attacks". Int'l Journal of Computer Applications vol. 10, No. 5, Nov. 2010.

Gupta, G. and Pieprzyk, J. "Reversible and Blind Database Watermarking Using Difference Expansion". e-Forensics Jan. 2008.

Sion, R. et al. "Rights Protection for Relational Data". Sigmod. Jun. 2003.

Rao, B.V.S. and Prasad M.V.N.K. "Subset Selection Approach for Watermarking Relational Databases". ICDEM 2010, LNCS 6411 2012.

Shehab, M. et al. "Watermarking Relational Databases Using Optimization-Based Techniques". IEEE Transactions on Knowledge and Data Engineering, vol. 20, No. 1 Jan. 2008.

Agrawal, R. and Kiernan, J. "Watermarking Relational Databases". Proceedings of the 28th VLDB Conference, Hong Kong, China 2002.

* cited by examiner

100

110

| Compute covariance matrix and eigenvectors |
| :---: |
| 111 |

↓

| Project row vectors of data matrix D onto eigenvectors |
| :---: |
| 112 |

↓

| Use binning algorithm to determine $r$ and $b$ for scaling the data |
| :---: |
| 113 |

↓

| Use Lomb-Scargle Transform on generated signal to find frequency of lowest power, $f^*$ |
| :---: |
| 114 |

↓

| Save $r$, $b$, $f^*$, $e_1$, and $e_2$ |
| :---: |
| 115 |

120

Extract all continuous real numeric columns to form matrix
121

Normalize data matrix so each column is mean-centered at 0 and has variance of 1
122

Compute covariance matrix $D^T D$
123

Project row vectors of data matrix onto orthonormal basis
124

Generate signal space
125

Generate watermark matrix
126

130

Project watermarked dataset onto orthonormal basis
$e_1, e_2$
131

Generate signal space
132

Find power of frequency and probability of false alarm
133

Extract watermark
134

METHODS AND SYSTEMS FOR EMBEDDING AND EXTRACTING FREQUENCY DOMAIN-BASED WATERMARKS IN TABULAR DATA

TECHNICAL FIELD

The present disclosure relates to digital data management, and, in particular, to methods and systems for embedding and extracting frequency domain-based watermarks in tabular data.

BACKGROUND

In today's society, data has become increasingly important, especially with the rise of machine learning in various aspects of people's lives. As data becomes more significant, its fair use, legal redistribution, and ownership will also become an integral part of our society. However, digital assets are different from tangible assets as they can be easily copied, modified, and shared from one party to another. This presents an issue regarding the ownership of intellectual property for digital assets. While copying, modifying, and sharing of digital assets cannot readily be stopped, alternative means can be used to highly discourage data consumers from performing any of those actions.

One such means is data watermarking, which comes in many flavors and has many different applications. Data watermarking is a way of embedding a marker or a message into a piece of data in a way that it cannot be easily removed. There are two types of watermarking algorithms: blind and non-blind. Blind watermarking refers to watermarking algorithms that do not require the original un-watermarked data at the time of extraction, whereas non-blind watermarking requires the original un-watermarked data at the time of extraction. Blind watermarking is a more appealing scenario as the original data may not be available when it is desired to extract the watermark.

Another classification of watermarking algorithms is zero-bit vs. multi-bit watermarking. Zero-bit watermarking is effectively a binary classification problem. The watermark algorithm manipulates the data to set a "flag" in the data to mark it as "watermarked". The watermark extraction algorithm is simply classifying whether a given piece of data has this "flag" set or not. Multi-bit watermarking is embedding a custom message into the data. The watermark extraction algorithm is to then check whether a given piece of data has been watermarked and if so recover the embedded message.

Data comes in all kinds of different formats, such as videos, images, tabular, text, and 3D models, among others. Current research has not found a single algorithm that handles all data formats, is robust to attacks, and does not damage the asset value significantly. Thus, a different algorithm must be used for each data format.

In one current approach, the watermarking embedding method utilizes a hashing function along with some degree of bit manipulation. To embed the watermark, the hashing method typically hashes each row of the tabular data and based on the hash splits the data into a specified number of partitions. Each partition has one or more bits embedded by flipping bits determined by some property of the partition.

In another approach, the watermarking embedding method splits the data into a number of partitions and alters statistical properties of the dataset. For instance, the algorithm may change mean or variance of the data in a selected partition based on the watermarking parameters. This change in statistical values can then be detected at extraction.

In a further approach, the original data is transformed into a time signal and then methods like DCT and DFT are used to transform the signal from the time domain to the frequency domain using techniques such as the Fourier transform. The watermark is then embedded in the frequency domain by modifying the coefficients of the transformed signal. The watermark can be extracted from the watermarked signal by applying the inverse transform to the modified signal.

Current bit manipulation methods are very susceptible to modification and deletion attacks. In addition, most of these prior arts rely on the tabular containing a primary key that remains unchanged after attack. This means if the attacker decides to remove the primary key column the watermark becomes nearly unrecoverable. Similarly, one simple attack to remove the watermarked bits is to add a small constant to every numeric value in the dataset. Since bit manipulations usually only alter the least significant bit (to avoid severely damaging the data), adding a small constant will likely erase the watermark bits.

Current statistical methods rely heavily on assumed properties of the data itself. This means at times, the watermark extraction algorithm can fail even without any attacks to the watermarked data. For instance, if a watermark embedding algorithm relies on the data variance to within a certain range, one could create a pathological dataset that has a variance far outside this range, thereby affecting the quality of the resulting watermarked data.

In some current solutions, frequency domain methods are used to embed the watermark into video, audio and image data. However, as stated, these methods only work for multi-media data and do not have an immediately obvious application towards tabular data. To that end, since multimedia is a continuous space that is a lot more noise resistant than discrete tabular data, the embedding algorithm is free to alter the data to much greater degree than discrete data. Thus, even if the methods were directly applied to tabular data, the watermarking method may severely damage the data impacting the utility of the watermarked data.

SUMMARY

In accordance with a first aspect of the present disclosure, there is provided a computer-implemented method for embedding a frequency domain-based watermark in tabular data, comprising: computing a covariance matrix for the tabular data; projecting row vectors of the tabular data onto two orthonormal vectors $e_1$, $e_2$; determining a signal space for the projected row vectors; locating a frequency f* with a lowest power from the signal space; and embedding a watermark in the tabular data based on the frequency f*.

In some or all exemplary embodiments of the first aspect, the determining of the signal space includes using a binning algorithm.

In some or all exemplary embodiments of the first aspect, the signal space is generated as $$S = ([x_i', y_i] | i = 1 \ldots N),$$

where $$\vec{x}' = \left[\frac{1}{r} \cdot \left\lfloor \frac{x_i}{b} \right\rfloor \mid i = 1 \ \dots \ N \right],$$

x is a projection of the tabular data onto $e_1$, y is a projection of the tabular data onto $e_2$, r is an embedded sine signal resolution, and b is a bin width determined by the binning algorithm.

In some or all exemplary embodiments of the first aspect, the method further includes saving r, b, f*, $e_1$, and $e_2$ as watermarking parameters.

In some or all exemplary embodiments of the first aspect, the locating includes using a domain-based transform.

In some or all exemplary embodiments of the first aspect, the domain-based transform is the Lomb-Scargle transform.

In some or all exemplary embodiments, the two orthnormal vectors are the normalized eigenvectors of the covariance matrix.

In some or all exemplary embodiments of the first aspect, the method further includes: determining a watermark matrix $$W \text{ as} = \vec{s} \otimes e_2 = s^T e_2^T,$$

where $\vec{s} = [A \sin(2\pi f * x'_i) \mid i = 1 \ \dots \ N]^T$, and where $\vec{s} \otimes e_2$ denotes the outer product of $\vec{s}$ and $e_2$.

In some or all exemplary embodiments of the first aspect, watermarked data is determined to be D'=D+W, where D is the tabular data.

In a second aspect of the present disclosure, there is provided a computer-implemented method for extracting a frequency domain-based watermark in tabular data, comprising: receiving watermark parameters; computing a covariance matrix for the tabular data; projecting row vectors of the tabular data onto two orthonormal vectors $e_1$, $e_2$; determining a signal space for the projected row vectors; determining a power of a frequency f* specified in the watermark parameters; and extracting a frequency domain-based watermark from the tabular data based on the power of the frequency f*.

In some or all exemplary embodiments of the second aspect, the method further includes: determining a probability of false alarm.

In a third aspect of the present disclosure, there is provided a computing system for embedding a frequency domain-based watermark in tabular data, the computing system comprising: one or more processors; and memory storing machine-readable instructions that, when executed by the one or more processors, cause the computing system to: compute a covariance matrix for the tabular data; project row vectors of the tabular data onto two orthonormal vectors $e_1$, $e_2$; determine a signal space for the projected row vectors; locate a frequency f* with a lowest power from the signal space; and embed a watermark in the tabular data based on the frequency f*.

In some or all exemplary embodiments of the third aspect, the machine-readable instructions, when executed by the one or more processors, cause the computing system to determine of the signal space includes using a binning algorithm.

In some or all exemplary embodiments of the third aspect, the machine-readable instructions, when executed by the one or more processors, cause the computing system to generate the signal space as $$S = ([x'_i, y_i] \mid i = 1 \ \dots \ N),$$

where $$\vec{x}' = \left[\frac{1}{r} \cdot \left\lfloor \frac{x_i}{b} \right\rfloor \mid i = 1 \ \dots \ N \right],$$

x is a projection of the tabular data onto $e_1$, y is a projection of the tabular data onto $e_2$, r is an embedded sine signal resolution, and b is a bin width determined by the parameter tuning algorithm.

In some or all exemplary embodiments of the third aspect, the machine-readable instructions, when executed by the one or more processors, cause the computing system to save r, b, f*, $e_1$, and $e_2$ as watermarking parameters.

In some or all exemplary embodiments of the third aspect, the machine-readable instructions, when executed by the one or more processors, cause the computing system to locate the frequency f* using a domain-based transform.

In some or all exemplary embodiments of the third aspect, the domain-based transform is the Lomb-Scargle transform.

In some or all exemplary embodiments of the third aspect, the two orthonormal vectors are the normalized eigenvectors of the covariance matrix.

In some or all exemplary embodiments of the third aspect, the machine-readable instructions, when executed by the one or more processors, cause the computing system to: determine a watermark matrix as $$= \vec{s} \otimes e_2 = s^T e_2^T,$$

where $\vec{s} = [A \sin(2\pi f * x'_i) \mid i = 1 \ \dots \ N]^T$, and where $\vec{s} \otimes e_2$ denotes the outer product of $\vec{s}$ and $e_2$.

In some or all exemplary embodiments of the third aspect, the machine-readable instructions, when executed by the one or more processors, cause the computing system to determine watermarked data to be D'=D+W, where D is the tabular data.

In a fourth aspect of the present disclosure, there is provided a computing system for extracting a frequency domain-based watermark in tabular data, the computing system comprising: one or more processors; and memory storing machine-readable instructions that, when executed by the one or more processors, cause the computing system to: receive watermark parameters; compute a covariance matrix for the tabular data; project row vectors of the tabular data onto two orthonormal vectors $e_1$, $e_2$; determine a signal space for the projected row vectors; determine a power of a frequency f* specified in the watermark parameters; and extract a frequency domain-based watermark from the tabular data based on the power of the frequency f*.

In some or all exemplary embodiments of the fourth aspect, the machine-readable instructions, when executed by the one or more processors, cause the computing system to: determine a probability of false alarm.

In a fifth aspect of the present disclosure, there is provided a non-transitory machine-readable medium having tangibly stored thereon executable instructions for execution by one or more processors, wherein the executable instructions, in response to execution by the one or more processors, cause the one or more processors to: compute a covariance matrix for the tabular data; project row vectors of the tabular data onto two orthonormal vectors $e_1$, $e_2$ of the covariance matrix; determine a signal space for the projected row vectors; locate a frequency f* with a lowest power from the signal space; and embed a watermark in the tabular data based on the frequency f*.

In a sixth aspect of the present disclosure, there is provided a non-transitory machine-readable medium having tangibly stored thereon executable instructions for execution by one or more processors, wherein the executable instructions, in response to execution by the one or more processors, cause the one or more processors to: receive watermark parameters; compute a covariance matrix for the tabular data; project row vectors of the tabular data onto two orthonormal vectors $e_1$, $e_2$ of the covariance matrix; determine a signal space for the projected row vectors; determine a power of a frequency f* specified in the watermark parameters; and extract a frequency domain-based watermark from the tabular data based on the power of the frequency f*.

Other aspects and features of the present disclosure will become apparent to those of ordinary skill in the art upon review of the following description of specific implementations of the application in conjunction with the accompanying figures.

BRIEF DESCRIPTION OF THE DRAWINGS

Reference will now be made, by way of example, to the accompanying drawings which show example embodiments of the present application, and in which.

6

Figure 7:
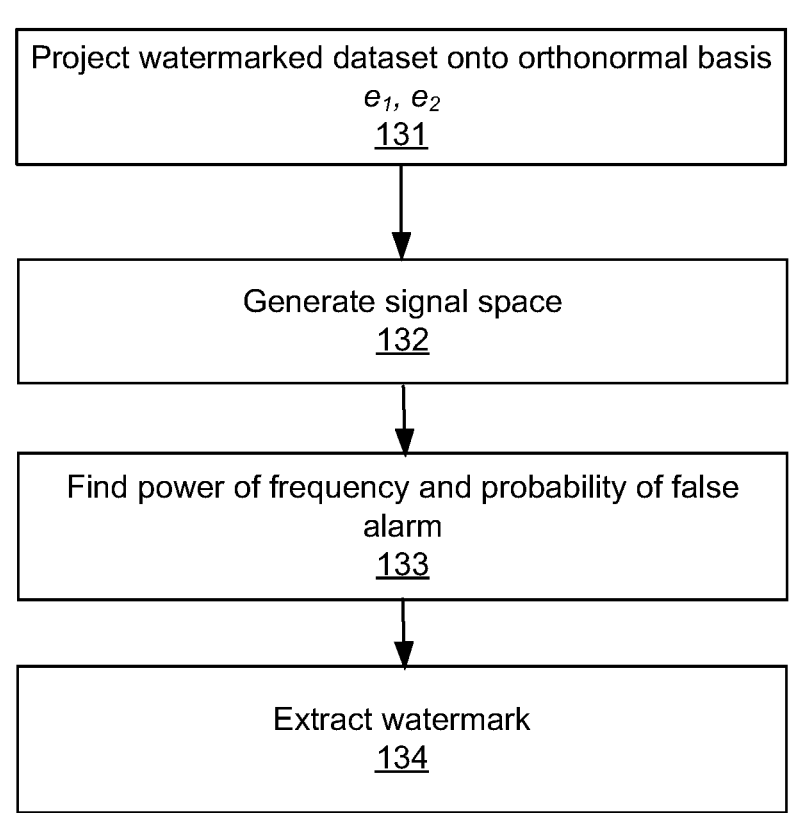
FIG. 7 is a schematic diagram illustrating the process of extracting a watermark in during the method for embedding and extracting a frequency domain-based watermark in data of FIG. 2 in accordance with example embodiments described herein.
Figure 8:
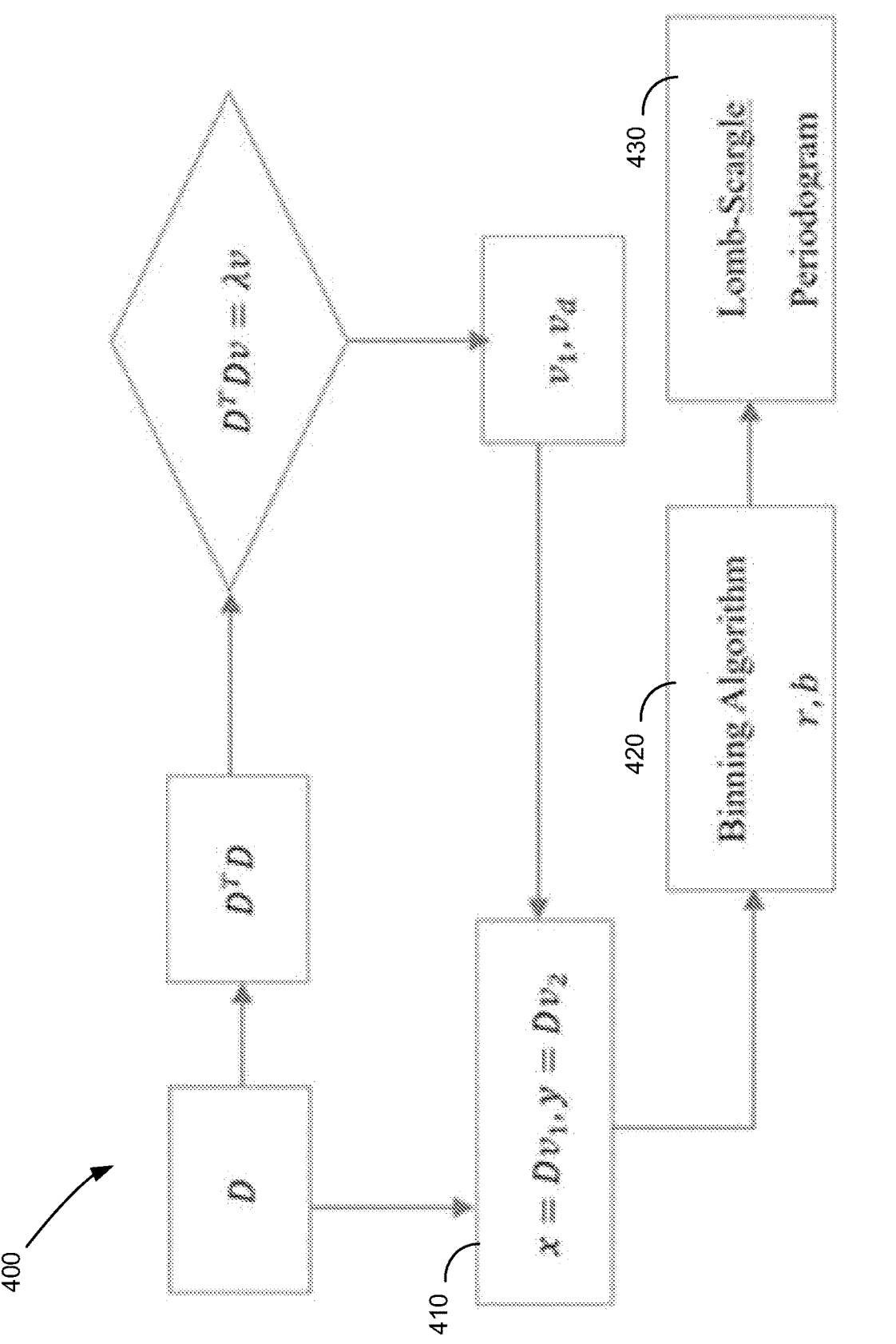

FIG. 8 is a schematic diagram illustrating the algorithm for extracting a watermark used in the process of FIG. 7 in accordance with example embodiments described herein.

Figure 9:
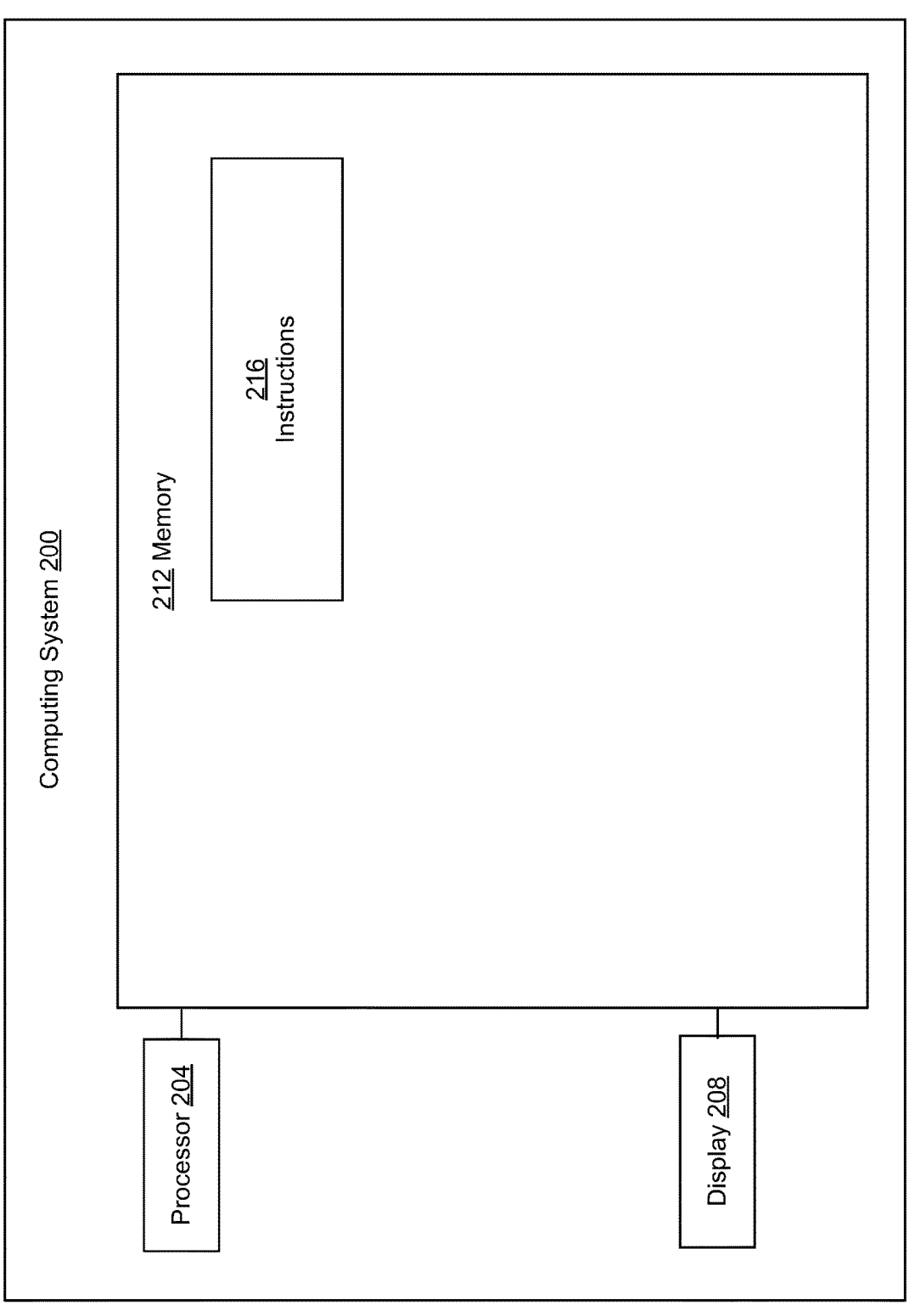

FIG. 9 is a schematic diagram of a computing system for embedding and/or extracting a frequency domain-based watermark in/from tabular data in accordance with some example embodiments described herein.

Similar reference numerals may have been used in different figures to denote similar components. Unless otherwise specifically noted, articles depicted in the drawings are not necessarily drawn to scale.

DETAILED DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

The present disclosure describes example embodiments of methods, systems, and machine-readable media for embedding and extracting frequency domain-based watermarks in tabular data. A goal of the proposed tabular data watermarking method is to embed a watermark into tabular data that is relatively robust to a variety of attacks and does not impact the value of the resulting watermarked data.

Figure 1:
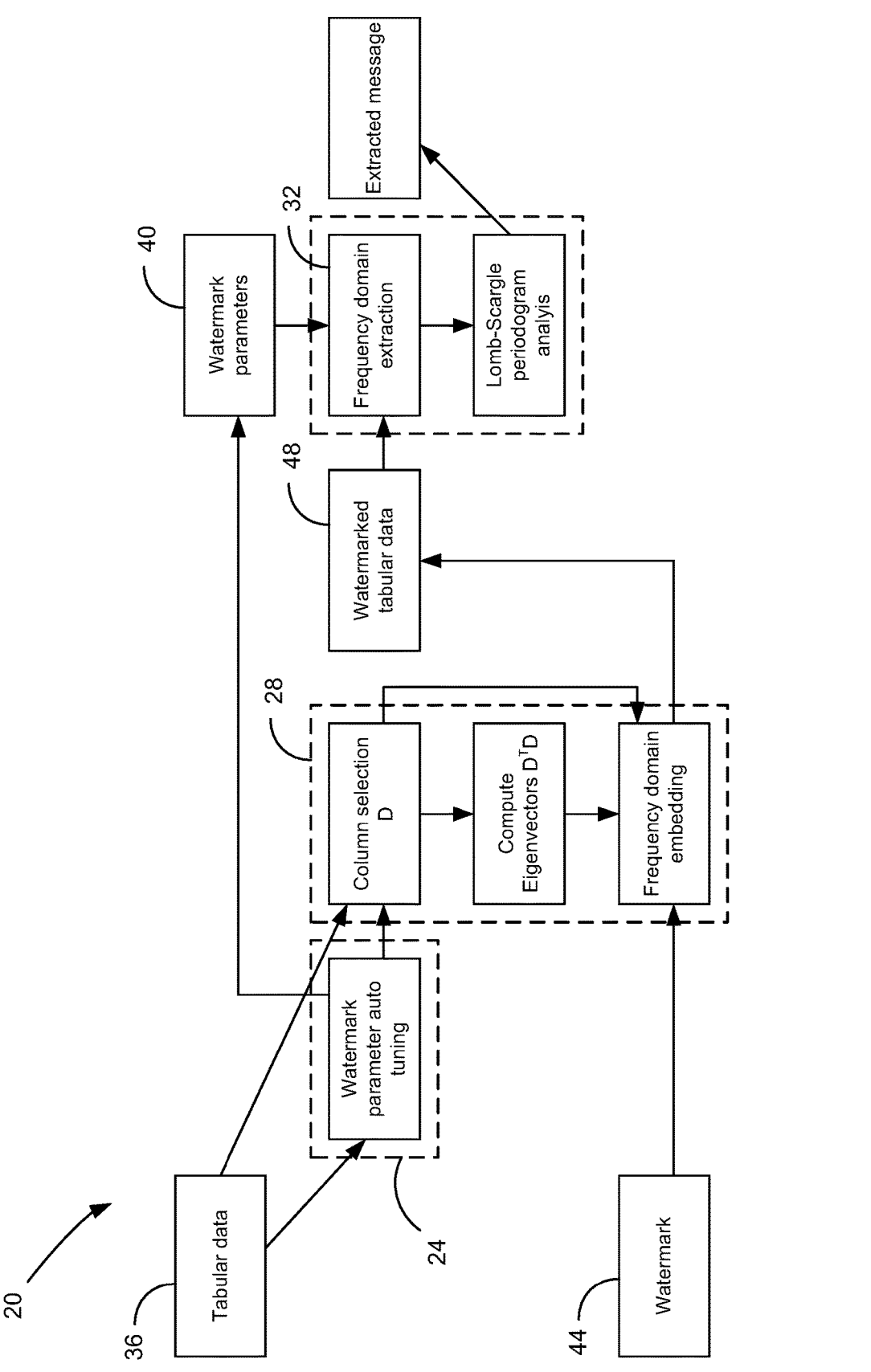
FIG. 1 is a schematic diagram illustrating an architecture for embedding and extracting frequency domain-based watermarks in tabular data in accordance with example embodiments described herein.

Referring now to FIG. 1, a proposed architecture 20 is composed of three different components; namely, a parameter-tuning component 24, an embedding component 28, and an extraction component 32. The parameter-tuning component 24 takes tabular data 36 and uses the LSP to generate a set of locally optimal watermark parameters 40 for watermarking. The algorithm used by the parameter-tuning component 24 finds the lowest frequency in the signal space of the dataset and embeds a watermark 44 into this frequency to ensure the lowest impact on the utility of the data. The watermark 44 encodes a watermark message, such as an identifier of a licensed party, a licensing transaction identifier, etc. The embedding component 28 then uses the watermark parameters generated by the parameter-tuning component 24 to reconstruct the signal space. A sine signal is embedded in the tabular data 36 at the frequency given by the parameter-tuning component 24 to generate watermarked tabular data 48, and the watermark 44 is mapped to this frequency and stored somewhere safe. In order to extract the watermark 44 and read the corresponding message, the extraction component 32 takes in the watermarked dataset and the keys stored by the data owner and outputs a Boolean determining whether the given frequency was embedded into the watermarked tabular data 48. This three-step process ensures that the watermark 44 is embedded in a way that minimizes the impact on the utility of the tabular data 36 and can be extracted accurately when needed.

The disclosed approach is applicable to any system that plans to offer data watermarking, including, but not limited to, tabular data. For instance, the disclosed approach would be beneficial to data exchange platforms, such as Amazon® Web Services Data Exchange, as tabular data owners would be able to protect the copyright of the data by embedding a watermark into it. Using the proposed disclosed approach, parties who need their ownership to be identified after they sell their data can do so. The disclosed approach can be used in digital asset trading platforms and data marketplaces. It can also be used on machine learning dataset websites which provide datasets for machine learning purposes.

Furthermore, the proposed approach does not rely on a primary key in the tabular data while maintaining robustness towards insertion, deletion and modification attacks.

Figure 2:
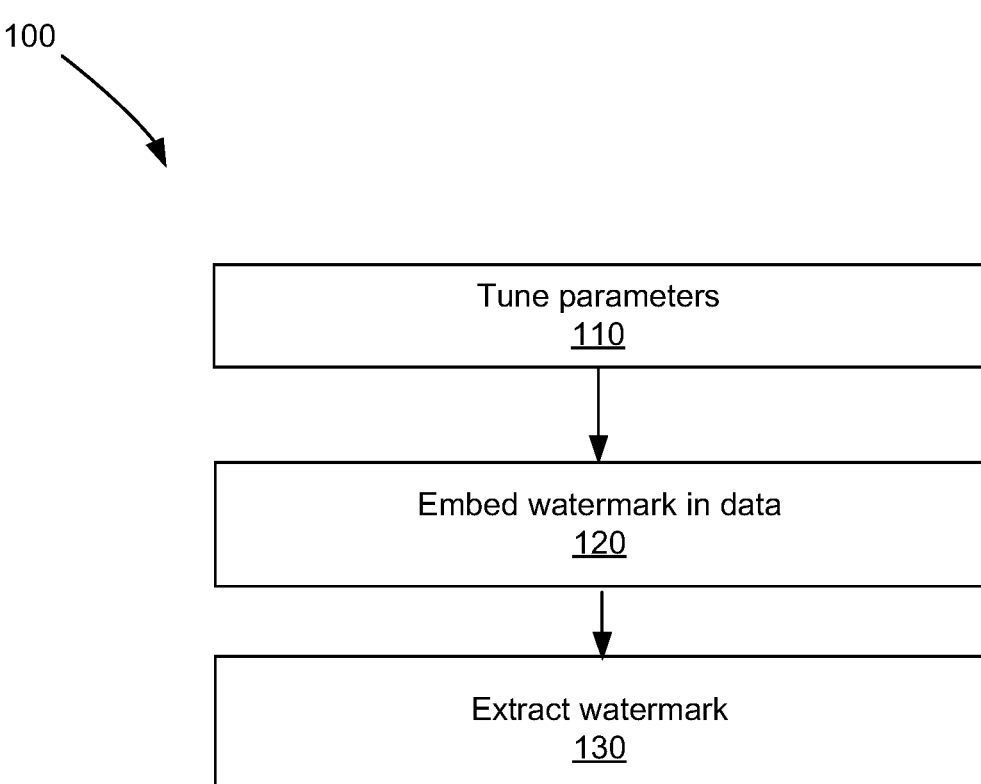
FIG. 2 is a general method for embedding and extracting frequency domain-based watermarks in tabular data in accordance with example embodiments described herein.

FIG. 2 shows a general method 100 for frequency domain-based watermarking of tabular data. In the method 100, parameters are tuned for the data in which the watermark is to be embedded (110). Using the tuned parameters, the watermark is then embedded in the data (120). Once the watermark is embedded in the data, it can be extracted (130).

Figure 3:
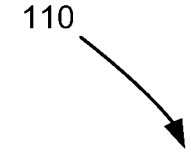
FIG. 3 is a schematic diagram illustrating the process of parameter tuning during the method for embedding and extracting a frequency domain-based watermark in tabular data of FIG. 2 in accordance with example embodiments described herein.
Figure 3:
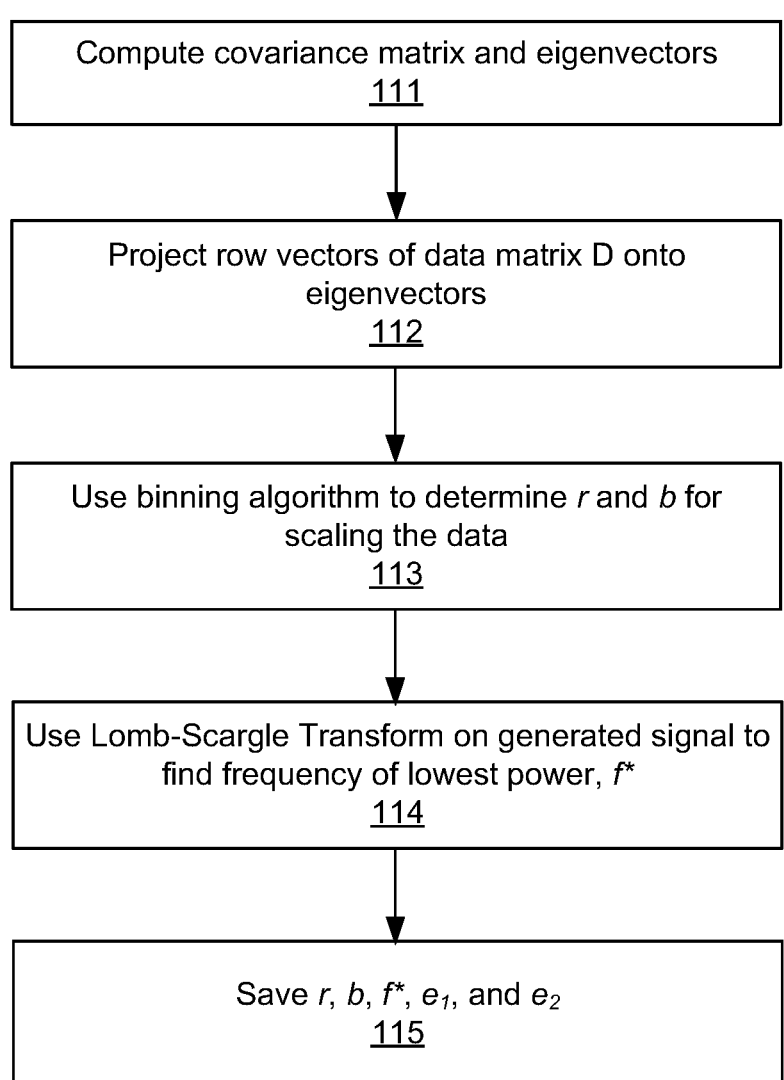

FIG. 3 shows the parameter-tuning process 110 used to find the unique parameters that can be used to embed and extract a watermark from a dataset. The first step is to compute the covariance matrix and its respective eigenvectors (111). The row vectors of the data matrix are then projected onto the orthonormal basis $e_1$, $e_2$ (112). $e_1$ and $e_2$ are the x and y projection vectors for the signal, respectively. While any set of orthonormal basis vectors will produce a embedding, principal component analysis (PCA) states that when the data matrix is projected onto the eigenvector of the covariance matrix smallest eigenvalue, the variance is minimized. Defining $e_2$ as this vector will further reduce the amount alteration done to the watermarked data. On the other hand, the eigenvector with largest eigenvalue will maximize the variance of the projected data. Defining $e_2$ as this vector will ensure our signal space points are spread out evenly, thereby increasing the quality of our embedding. The projection is computed by multiplying the data matrix by the $e_1$ and $e_2$. A binning algorithm is then used to determine the value of the embedded sine resolution r using a bin width b, which are used to scale the data (113). Part of the parameter tuning algorithm determines the relatively optimal bin width b by feeding each candidate bin width b into the binning algorithm and examining its optimality as described in the parameter tuning algorithm.

Finally, the Lomb-Scargle Transform is used on the signal generated from the projection to find the frequency with the lowest power, which is denoted as f* (114). The values of r, b, f*, $e_1$, and $e_2$ that are used as the unique parameters that can be used to extract the watermark are then saved (115).

Figure 4:
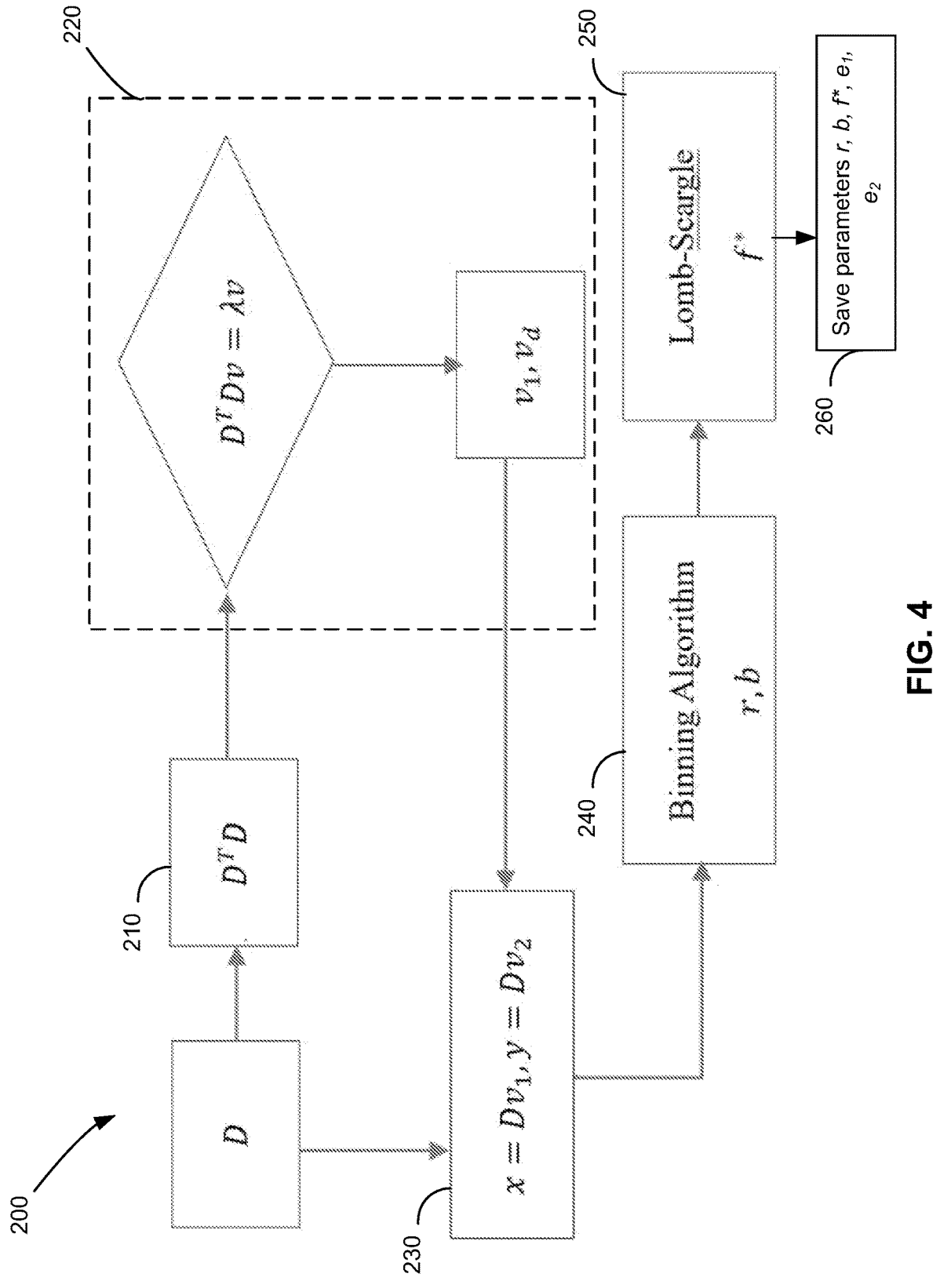
FIG. 4 is a schematic diagram illustrating the algorithm for parameter tuning used in the process of FIG. 3 in accordance with example embodiments described herein.

In FIG. 4, a version of the parameter-tuning algorithm 200 is given with implementation level detail. First, the covariance matrix, $D^T D$, is computed (210). The row vectors of the data matrix, D, are projected onto an orthonormal basis $e_1$, $e_2$, where $e_1$, $e_2$ are any two normalized eigenvectors of are $D^T D$ (220). Since $D^T D$ is symmetric, it will follow that $e_1 \cdot e_2 = 0$. In the proposed method, any orthonormal basis will work; however, eigenvectors are selected as they are convenient and can be determined using only using the data matrix.

The projection is computed as $$\vec{x} = De_1, \text{ and}$$

$$\vec{y} = De_2 (230).$$

The signal space is generated as $$S = ([x_i', y_i] \mid i = 1 \ \ldots \ N),$$

$$\text{where } \vec{x}' = \left[ \frac{1}{r} \cdot \left\lfloor \frac{x_i}{b} \right\rfloor \right] \mid i = 1 \ \ldots \ N \right].$$

r and b are decided upon by power of lowest power frequency, f* (240).

The Lomb-Scargle Transform (generalization of Discrete Fourier Transform to allow for unequal sampling intervals) is next used to find the frequency with the lowest power, $f^* \in [f_1, f_2]$ (250). The resulting parameters, r, b, f*, $e_1$, $e_2$ are then saved (260). These are the unique parameters ("secret key") that can be used to later extract the watermark.

Figure 5:
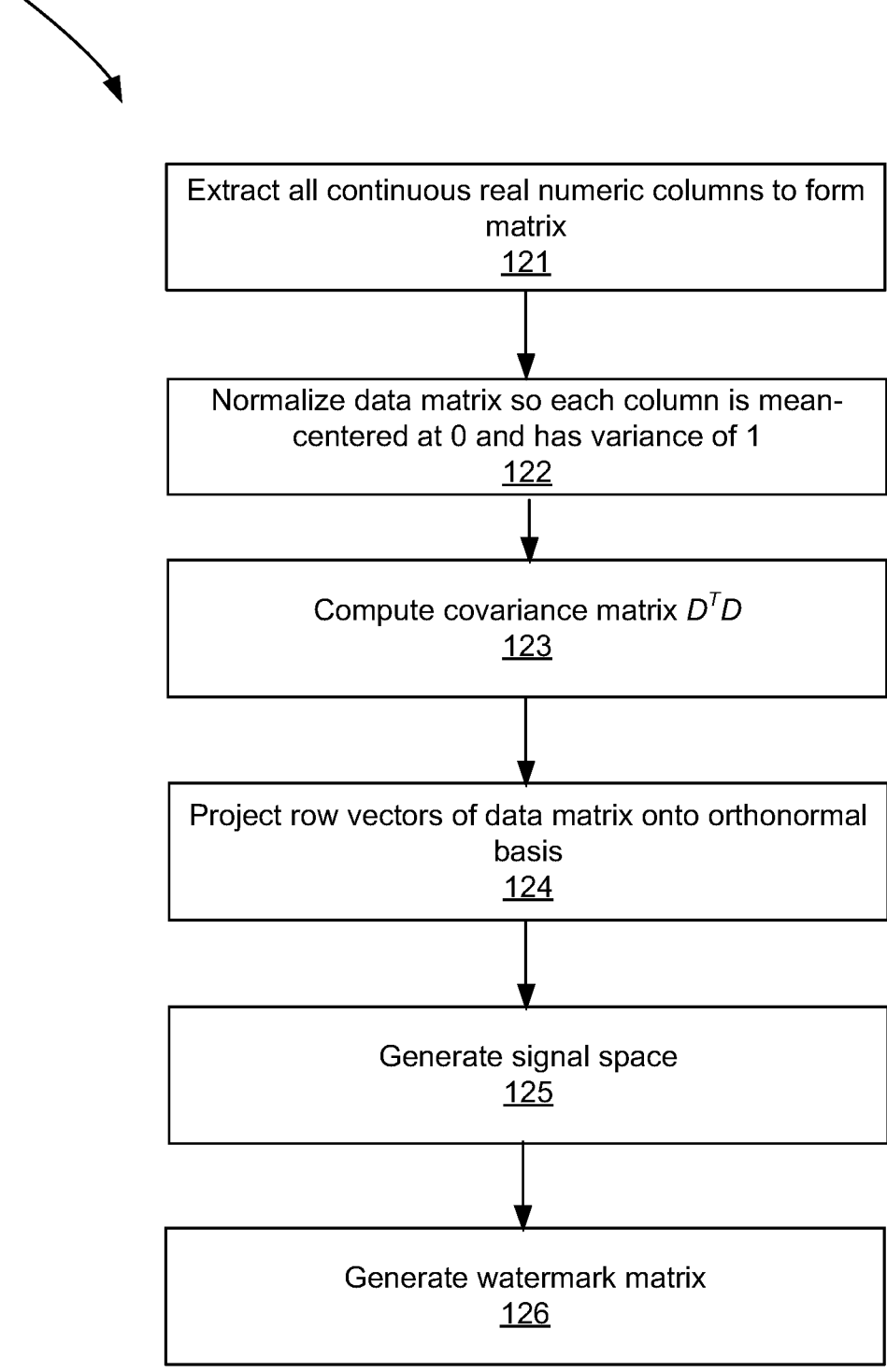
FIG. 5 is a schematic diagram illustrating the process of embedding a watermark in during the method for embedding and extracting a frequency domain-based watermark in data of FIG. 2 in accordance with example embodiments described herein.

FIG. 5 shows the process 120 of embedding the watermark in a dataset. The first step is to extract all continuous real numeric columns in the tabular data and use them to form a data matrix (121). The data matrix is then standardized so that each column is mean-centered at 0 and has a variance of 1 (122). Next, the covariance matrix is computed (123) and the row vectors of the data matrix are projected onto an orthonormal basis (124). This generates a discrete series of values, where each y-coordinate represents a value on the axis spanned by $e_2$. A binning algorithm is used on the signal space to increase the resulting embedding robustness (125). The embedded signal is represented as a vector of whose elements are points on the sine signal. The watermark matrix is the outer product of the embed signal and the eigenvector with smallest eigenvalue. The watermark matrix is then added to the data matrix to create the watermarked data matrix (126).

Figure 6:
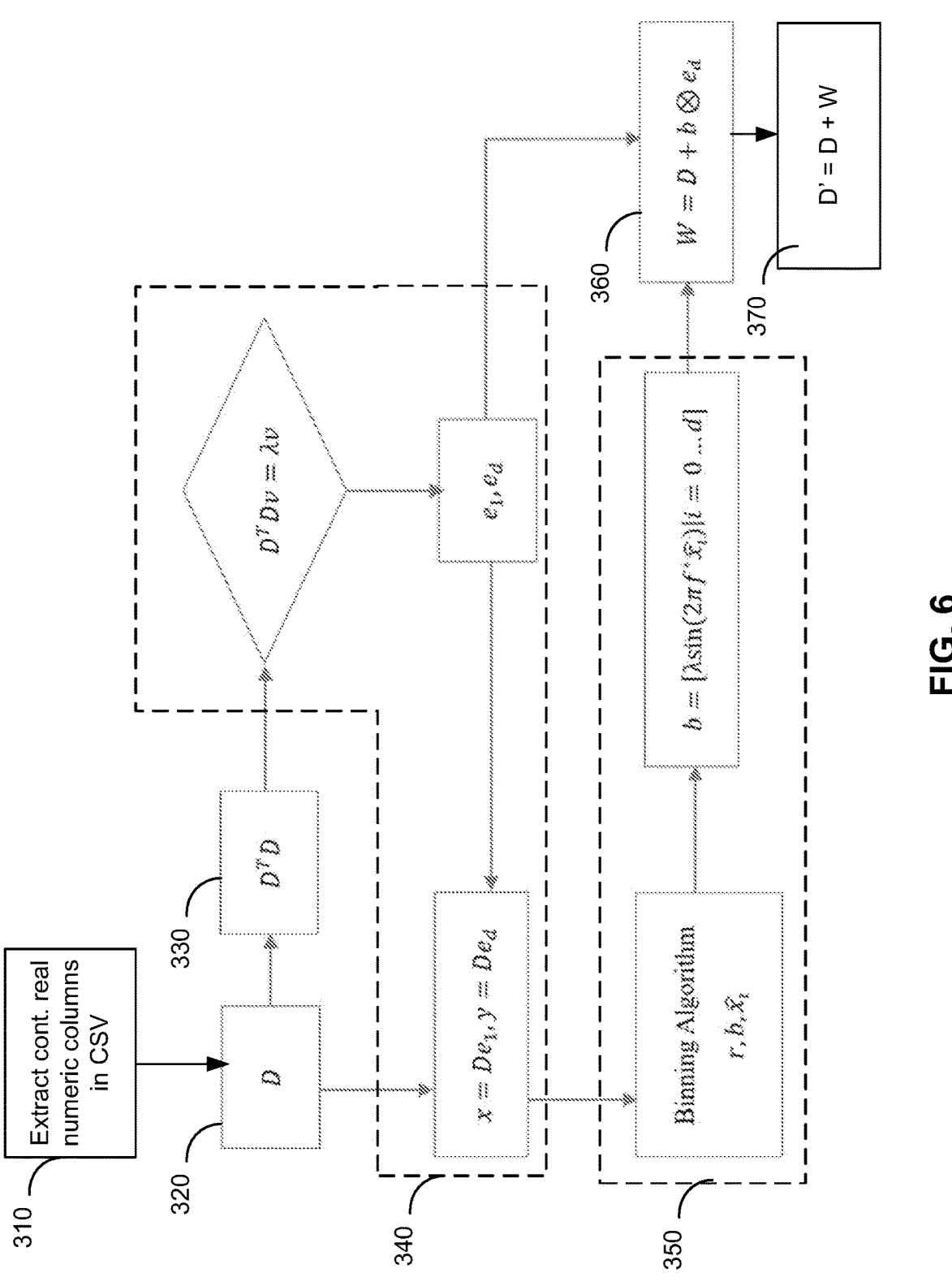
FIG. 6 is a schematic diagram illustrating the algorithm for embedding a watermark used in the process of FIG. 5 in accordance with example embodiments described herein.

Now referring to FIG. 6, a version of the embedding algorithm 300 is given with implementation level detail. All continuous real numeric columns in the CSV are extracted and used to form a data matrix, D, where each attribute forms a column vector in D (310). The data matrix D is then normalized such that each column is mean-centered at 0 and has a variance of 1 (320). The covariance matrix, $D^T D$, is computed (330). Row vectors of the data matrix, D, are projected onto an orthonormal basis $e_1$, $e_2$ (340). The projection is computed as $$\vec{x} = De_1, \text{ and}$$

$$\vec{y} = De_2$$

Next, the signal space is generated as $$S = ([x_i', y_i] \mid i = 1 \ \ldots \ N),$$

where $$\vec{x}' = \left[ \frac{1}{r} \cdot \left\lfloor \frac{x_i}{b} \right\rfloor \mid i = 1 \ \dots \ N \right]. \tag{350}$$

The embed signal is represented as $$\vec{s} = [A\sin(2\pi f^* x'_i) \mid i = 1 \ \dots \ N]^T. $$

The watermark matrix is calculated as $$W = \vec{s} \otimes e_2 = s^T e_2^T. \tag{360}$$

The watermarked data matrix is then determined as $$D' = D + W. \tag{370}$$

Once the watermark has been inserted into the data, it can be extracted using the parameters.

FIG. 7 shows the extraction process 130 used to extract a watermark from a watermarked dataset. The first step is to project the watermarked dataset onto the given orthonormal basis (131). This generates the signal space. Then, a binning algorithm is used to group the points in the signal space such that for all points that share the same x coordinate, the average of the respective y-coordinates is used to map them into one coordinate (132). Next, the Lomb-Scargle Transform is used to find the power of the given frequency, f, and the probability of false alarm (133). This allows for the extraction of the watermark from the watermarked dataset (134).

FIG. 8 shows a version of an extraction algorithm 400 with implementation level detail. Given watermarked dataset, D'=D+W, it is projected onto the given orthonormal basis $e_1$, $e_2$, $$\vec{x} = D' e_1, \text{ and}$$

$$\vec{y} = D' e_2.$$

The signal space is generated as $$S = ([x'_i, y_i] \mid i = 1 \ \dots \ N),$$

where $$\vec{x}' = \left[ \frac{1}{r} \cdot \left\lfloor \frac{x_i}{b} \right\rfloor \mid i = 1 \ \dots \ N \right].$$

For all points in S that share the same x coordinate, these are mapped onto one coordinate by taking the average over the respective y-coordinates.

The Lomb-Scargle Transform is then used to find the power of given frequency, f, and probability of false alarm using the approach described in "Assessing statistical significance of periodogram peaks", R. V. Baluev, 2008 (arXiv: 0711.0330) (430).

FIG. 9 shows various physical and logical components of an exemplary computing system 500 frequency domain-based watermarking of tabular data in accordance with an embodiment of the present disclosure. Although an example embodiment of the computing system 500 is shown and discussed below, other embodiments may be used to implement examples disclosed herein, which may include components different from those shown. Although FIG. 9 shows a single instance of each component of the computing system 500, there may be multiple instances of each component shown.

The computing system 500 includes one or more processors 504, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 504 may collectively be referred to as a processor 504. The computing system 500 may include a display 508 for outputting data and/or information in some applications, but may not in some other applications.

The computing system 500 includes one or more memories 512 (collectively referred to as "memory 512"), which may include a volatile or non-volatile memory (e.g., a flash memory, a random access memory (RAM), and/or a read-only memory (ROM)). The non-transitory memory 512 may store machine-executable instructions for execution by the processor 504. A set of machine-executable instructions 516 defining application processes for embedding and/or extracting frequency domain-based watermarks in/from tabular data (described herein) is shown stored in the memory 512, which may be executed by the processor 504 to perform the steps of the methods described herein. The memory 512 may include other machine-executable instructions for execution by the processor 504, such as machine-executable instructions for implementing an operating system and other applications or functions.

The memory 512 may also store other data, information, rules, policies, and machine-executable instructions described herein.

In some examples, the computing system 500 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the computing system 500) or may be provided by a transitory or non-transitory machine-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 512 to implement data storage, retrieval, and caching functions of the computing system 500.

The components of the computing system 500 may communicate with each other via a bus, for example. In some embodiments, the computing system 500 is a distributed computing system and may include multiple computing devices in communication with each other over a network, as well as optionally one or more additional components. The various operations described herein may be performed by different computing devices of a distributed system in some embodiments. In some embodiments, the computing system 500 is a virtual machine provided by a cloud computing platform.

Although the components for both embedding and extracting frequency-based watermarks in tabular data are shown as part of the computing system 500, it will be understood that separate computing devices can be used for embedding and extracting the frequency-based watermarks.

Using the approach described herein, watermark embedding quality is not dependent on the original data and does not rely on certain properties of the data to guarantee high quality embedding. The method has fast embedding and extraction rates, with the ability to watermark ~67K tuples/s at the time of measurement.

Apart from using tabular data watermarking for copyright protection and proof of ownership, it can be applied to other forms of data. Since the proposed method only requires a discrete signal, there are many other forms of data that can be modified or reduced down to a discrete signal. For instance, audio data can be translated into a discrete signal and pass through the watermarking process described herein. Since the alteration percentage using the described approach is low, the amount of noise in the resulting watermarked audio can be minimal. To that end, the proposed approach also works for image data. Image data can be described as tabular data, where each column of pixel values corresponds to one attribute in the tabular data. Thus, images can be watermarked using the approach proposed herein. There are many forms of data that can ultimately be reduced down to a discrete signal. The approach proposed herein works with all such data. Many other forms of data like images, audio, video can all be reduced down to numerical tabular data and, thus, the discussed approach for watermarking can be employed with these other forms of data.

The approach does little to no damage to the original data provided the amplitude of the sine signal, A, is a reasonable value, with each numerical column value modified on average by $\pm 2A/\pi$. The alteration at worst is expected to be $\pm A$.

Further, the embedding algorithm is resistant to attacks that attempt to delete rows/columns of the tabular data and does not rely on a unchanged primary key.

While, in the above-described embodiments, row vectors of the tabular data are projected onto two normalized eigenvectors of the covariance matrix, any two orthonormal vectors can be used as a basis for the projection. The eigenbasis will do the least damage to the data utility while preserving the embedding quality. Since these basis vectors are also part of the secret key needed to extract the watermark, there is trade off that needs to be considered since an attacker can easily compute the eigenbasis and obtain part of the key.

While, in the above-described embodiments, the Lomb-Scargle transform is used to locate a frequency with a lowest power from the signal space, any other suitable domain-based transform can be employed in place of the Lomb-Scargle transform, such as, for example, the discrete Fourier transform, the discrete time Fourier transform, the discrete cosine transform, etc.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

In other embodiments, the same approach described herein can be employed for other modalities.

General

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

13

The invention claimed is:

1. A computer-implemented method for embedding a frequency domain-based watermark in tabular data, comprising:

computing a covariance matrix for the tabular data;

projecting row vectors of the tabular data onto two orthonormal vectors $e_1$, $e_2$;

determining a signal space for the projected row vectors of the tabular data;

locating a frequency f* with a lowest power from the signal space; and embedding a watermark in the tabular data based on the frequency f* with the lowest power from the signal space.

2. The computer-implemented method of claim 1, wherein the determining of the signal space includes using a binning algorithm.

3. The computer-implemented method of claim 2, wherein the signal space is generated as $$S = ([x_i', y_i] \mid i = 1 \ \ldots \ N),$$

where $$\vec{x}' = \left[ \frac{1}{r} \cdot \left\lfloor \frac{x_i}{b} \right\rfloor \mid i = 1 \ \ldots \ N \right],$$

x is a projection of the tabular data onto $e_1$, y is a projection of the tabular data onto $e_2$, r is an embedded sine signal resolution, and b is a bin width determined by the binning algorithm.

4. The computer-implemented method of claim 3, further comprising saving r, b, f*, $e_1$, and $e_2$ as watermarking parameters.

5. The computer-implemented method of claim 1, wherein the locating includes using a domain-based transform.

6. The computer-implemented method of claim 5, wherein the domain-based transform is the Lomb-Scargle transform.

7. The computer-implemented method of claim 1, wherein the two orthonormal vectors are the normalized eigenvectors of the covariance matrix.

8. The computer-implemented method of claim 3, further comprising:

determining a watermark matrix W as $$W = \vec{s} \otimes e_2 = s^T e_2^T,$$

where $$\vec{s} = [A\sin(2\pi f^* x_i') \mid i = 1 \ \ldots \ N]^T,$$

and where $\vec{s} \otimes e_2$ denotes the outer product of $\vec{s}$ and $e_2$.

9. The computer-implemented method of claim 8, wherein watermarked data is determined to be $$D' = D + W,$$

where D is the tabular data.

10. A computer-implemented method for extracting a frequency domain-based watermark in tabular data, comprising:

14 receiving watermark parameters;

computing a covariance matrix for the tabular data;

projecting row vectors of the tabular data onto two orthonormal vectors $e_1$, $e_2$;

determining a signal space for the projected row vectors of the tabular data;

determining a power of a frequency f* specified in the watermark parameters; and extracting a frequency domain-based watermark from the tabular data based on the power of the frequency f*.

11. The computer-implemented method of claim 10, further comprising:

determining a probability of false alarm.

12. A computing system for embedding a frequency domain-based watermark in tabular data, the computing system comprising:

one or more processors; and memory storing machine-readable instructions that, when executed by the one or more processors, cause the computing system to:

compute a covariance matrix for the tabular data;

project row vectors of the tabular data onto two orthonormal vectors $e_1$, $e_2$;

determine a signal space for the projected row vectors of the tabular data;

locate a frequency f* with a lowest power from the signal space; and embed a watermark in the tabular data based on the frequency f* with the lowest power from the signal space.

13. The computing system of claim 12, wherein the machine-readable instructions, when executed by the one or more processors, cause the computing system to determine the signal space using a binning algorithm.

14. The computing system of claim 13, wherein the machine-readable instructions, when executed by the one or more processors, cause the computing system to generate the signal space as $$S = ([x_i', y_i] \mid i = 1 \ \ldots \ N),$$

where $$\vec{x}' = \left[ \frac{1}{r} \cdot \left\lfloor \frac{x_i}{b} \right\rfloor \mid i = 1 \ \ldots \ N \right],$$

x is a projection of the tabular data onto $e_1$, y is a projection of the tabular data onto $e_2$, r is an embedded sine signal resolution, and b is a bin width determined by the binning algorithm.

15. The computing system of claim 14, wherein the machine-readable instructions, when executed by the one or more processors, cause the computing system to save r, b, f*, $e_1$, and $e_2$ as watermarking parameters.

16. The computing system of claim 12, wherein the machine-readable instructions, when executed by the one or more processors, cause the computing system to locate the frequency f* using a domain-based transform.

17. The computing system of claim 16, wherein the domain-based transform is the Lomb-Scargle transform.

18. The computing system of claim 12, wherein the two orthonormal vectors are the normalized eigenvectors of the covariance matrix.

19. The computing system of claim 14, wherein the machine-readable instructions, when executed by the one or more processors, cause the computing system to:

determine a watermark matrix $W$ as $$W = \vec{s} \otimes e_2 = s^T e_2^T,$$

where $$\vec{s} = [A\sin(2\pi f^* x'_i) \mid i = 1 \ ... \ N]^T,$$

and where $\vec{s} \otimes e_2$ denotes the outer product of $\vec{s}$ and $e_2$.

20. The computing system of claim 19, wherein the machine-readable instructions, when executed by the one or more processors, cause the computing system to determine watermarked data to be $$D' = D + W,$$

where D is the tabular data.

* * * * *